(12) United States Patent
Lum et al.

(10) Patent No.: US 9,478,066 B2
(45) Date of Patent: Oct. 25, 2016

(54) CONSISTENT VERTEX SNAPPING FOR VARIABLE RESOLUTION RENDERING

(71) Applicant: NVIDIA Corporation, Santa Clara, CA (US)

(72) Inventors: Eric Brian Lum, San Jose, CA (US); Henry Packard Moreton, Woodside, CA (US); Kyle Perry Roden, Huntsville, AL (US); Walter Robert Steiner, Flagler Beach, FL (US); Ziyad Sami Hakura, Gilroy, CA (US)

(73) Assignee: NVIDIA Corporation, Santa Clara, CA (US)

( * ) Notice: Subject to any disclaimer, the term of this patent is extended or adjusted under 35 U.S.C. 154(b) by 70 days.

(21) Appl. No.: 13/830,987

(22) Filed: Mar. 14, 2013

(65) Prior Publication Data

US 2014/0267232 A1    Sep. 18, 2014

(51) Int. Cl.
*G06T 17/00*    (2006.01)
*G06T 19/20*    (2011.01)

(52) U.S. Cl.
CPC ............ *G06T 17/00* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 6,219,070 B1* | 4/2001 | Baker et al. | 345/475 |
| 7,015,920 B2* | 3/2006 | Ono | G09G 5/391 |
| | | | 345/545 |
| 8,390,645 B1* | 3/2013 | Crow et al. | 345/613 |
| 2004/0207642 A1* | 10/2004 | Crisu et al. | 345/626 |
| 2009/0195555 A1 | 8/2009 | Nystad et al. | |
| 2011/0043517 A1 | 2/2011 | Schneider et al. | |
| 2014/0253555 A1 | 9/2014 | Lum et al. | |
| 2014/0267238 A1 | 9/2014 | Lum et al. | |

OTHER PUBLICATIONS

"Apache OpenOffice Wiki", "Snap to grid—Apache OpenOffice Wiki", Apr. 12, 2008.*
Roca, J. et al., "A SIMD?efficient 14 instruction shader program for high-throughput microtriangle rasterization," The Visual Computer, vol. 26, 2010, pp. 707-719.
Lloyd, D.B. et al., "Practical logarithmic rasterization for low-error shadow maps," Graphics Hardware, ACM, 2007, Aug. 2007, pp. 1-9.
Examination Report from German Patent Application No. 10 2013 114 373.3, dated Sep. 30, 2014.
Office Action from Taiwan Patent Application No. 102141296, dated Nov. 3, 2015.

* cited by examiner

*Primary Examiner* — Mark Zimmerman
*Assistant Examiner* — Yu-Jang Tswei
(74) *Attorney, Agent, or Firm* — Zilka-Kotab, PC

(57) ABSTRACT

A system, method, and computer program product are provided for adjusting vertex positions. One or more viewport dimensions are received and a snap spacing is determined based on the one or more viewport dimensions. The vertex positions are adjusted to a grid according to the snap spacing. The precision of the vertex adjustment may increase as at least one dimension of the viewport decreases. The precision of the vertex adjustment may decrease as at least one dimension of the viewport increases.

18 Claims, 8 Drawing Sheets

Viewport 350

Sub-Pixel Grid Cells are 1/1024 Pixel Squared

US 9,478,066 B2

CONSISTENT VERTEX SNAPPING FOR VARIABLE RESOLUTION RENDERING

FIELD OF THE INVENTION

The present invention relates to three-dimensional (3D) graphics processing, and, more particularly, to snapping vertices to coordinates.

BACKGROUND

A graphics processing pipeline converts input graphics data that is typically associated with three-dimensional objects into pixel data that is associated with a two-dimensional surface. In conventional implementations, a world-space portion of the graphics processing pipeline is responsible for processing the input graphics data, which is usually composed of a collection of triangles and related vertices, prior to when the data is converted into pixel data. A screen-space portion of the graphics processing pipeline is responsible for processing the converted pixel data and generating final pixel values for display.

One of the stages in the graphics processing pipeline is the rasterization stage, which typically involves converting the graphics data processed by the world-space portion of the pipeline into pixel data in screen-space. Rasterization may involve generating edge equations that describe the edges of triangles processed in the world-space portion of the pipeline, determining coverage information for those triangles, and computing attribute values for the pixels and fragments covered by the triangles. The calculations involved in rasterization are generally fixed point calculations that are normally performed with a fixed fractional-pixel precision. Thus, the results of fixed point rasterization calculations can be thought of as "snapped" to a grid, where the boxes of the grid correspond to boxes of fractional-pixel size.

In many implementations, a graphics processing pipeline may rasterize the same three-dimensional object at different resolutions. For example, a triangle may first be rasterized at a low resolution to make certain determinations about the triangle, such as what general portions of a surface are covered by the triangle. The triangle may subsequently be rasterized at a higher resolution to generate image data for display. However, rasterization conducted at a lower resolution generally provides results that are "snapped" to a coarser grid than rasterization conducted at a higher resolution. Therefore, lower resolution rasterization may produce coverage results that do not properly align with the coverage results of higher resolution rasterization. For example, if frame buffer memory is allocated for sparse rendering based on the results of low resolution rasterization, memory may be over-allocated or under-allocated due to the fact that the results of lower-resolution rasterization are snapped to a coarser grid. More specifically, memory may be allocated for blocks for which no allocation is necessary, or memory may fail to be allocated for blocks for which allocation is necessary.

Thus, there is a need for addressing the issues of rasterizing graphics data at different resolutions and/or other issues associated with the prior art.

SUMMARY

A system, method, and computer program product are provided for adjusting vertex positions. One or more viewport dimensions are received and a snap spacing is determined based on the one or more viewport dimensions. The vertex positions are adjusted to a grid according to the snap spacing.

DETAILED DESCRIPTION

Conventionally, an object is rasterized at two different resolutions by applying a viewport transform for an object at the two different resolutions, calculating corresponding edge equations for the two different resolutions, and rasterizing the object at two different resolutions. A first viewport transform produces two-dimensional screen-space coordinates for the vertices of the object at the first resolution and a second viewport transform produces two-dimensional screen-space coordinates for the vertices of the object at the second resolution.

However, one drawback of the conventional approach is that applying the viewport transform at different resolutions causes the coordinates for the vertices of the object to be "snapped" to different grids, since the fixed fractional pixel size is different for different resolutions. This "snapping" to different resolutions means that vertices are repositioned differently for an object at the first resolution compared with the same object at the second resolution, causing the shape of the object to change as the resolution changes.

Since the amount of fractional pixel snap is relative to pixel size, a vertex projected to a high-resolution display surface is snapped less (relative to the surface size) than a vertex projected to a low resolution display surface. For example when vertices are snapped to $1/16$ of a pixel in the width or height and a 10×10 pixel display surface, a vertex is snapped $(1/16)/(10)=1/160$ of the total display surface width and/or height (i.e., the grid spacing is effectively $1/160$ in each dimension of the total display surface). On the other hand for a higher resolution display surface that is 80×80 pixels, when vertices are snapped to $1/16$ of a pixel, a vertex is snapped $(1/16)/(80)=1/1280$ of the total display surface width and/or height (i.e., the grid spacing is effectively $1/640$ of the total display surface dimension).

Figure 1A:
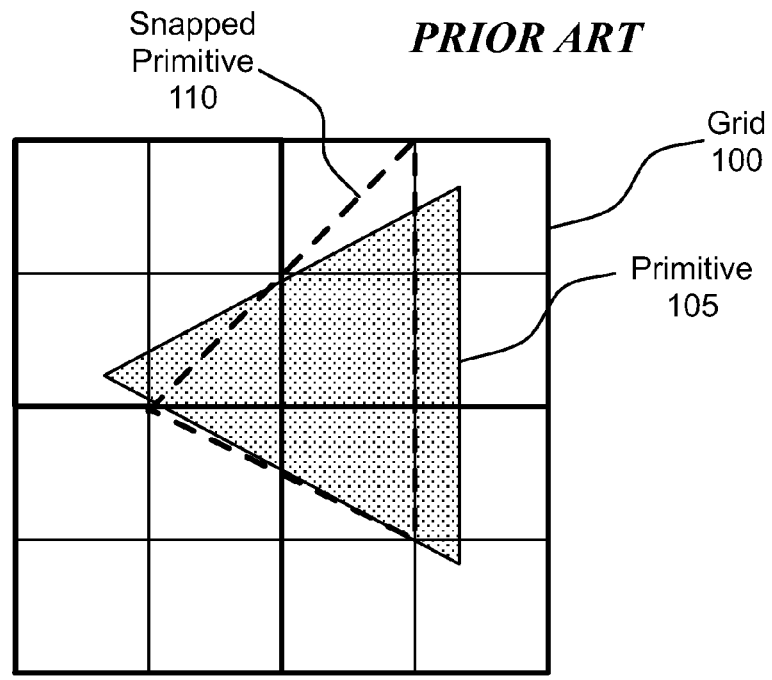
FIGS. 1A and 1B illustrate prior art snapping of primitive vertex positions to a grid.

FIG. 1A illustrates prior art snapping of primitive vertex positions to a grid 100. A primitive 105 comprising three vertices is snapped to the grid 100 that corresponds to a 2×2 pixel display surface. Each cell in the grid 100 corresponds to $1/4$ of a pixel and is sized $1/2$ pixels squared. The three vertices of the primitive 105 are snapped to grid cell at ½ of a pixel to produce a snapped primitive 110. The shape of the primitive changes as a result of the snapping.

Figure 1B:
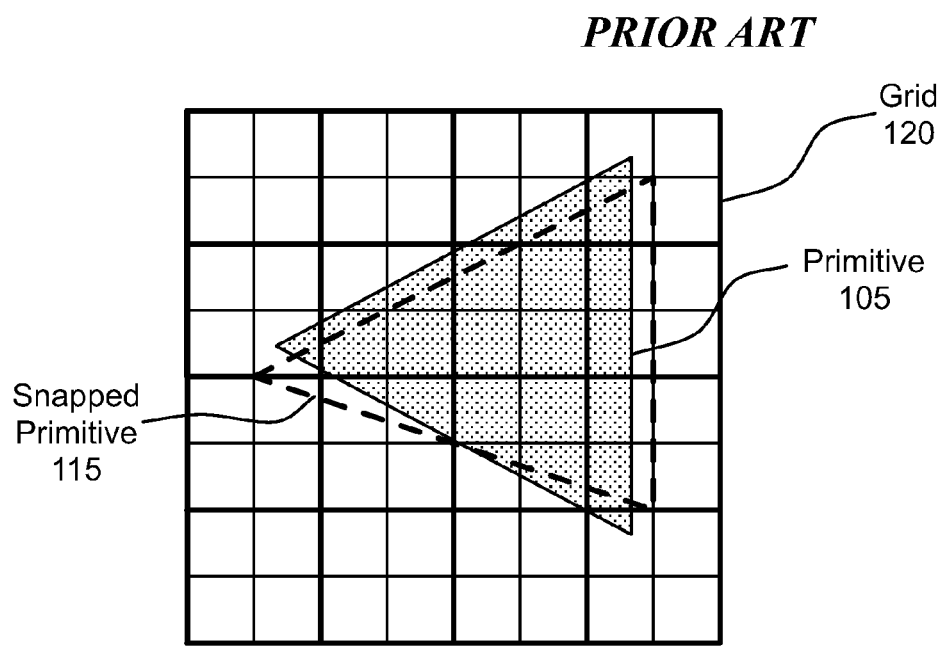

FIG. 1B illustrates prior art snapping of primitive vertex positions to a grid 120. The primitive 105 is snapped to the grid 120 that corresponds to a higher resolution 4×4 pixel display surface. Each cell in the grid 120 corresponds to ¼ of a pixel and is sized ½ pixels squared. The three vertices of the primitive 105 are snapped to the same ½ pixel precision to produce a snapped primitive 115. The shape of the primitive changes as a result of the snapping, and the shape of the snapped primitive 110 is different compared with the snapped primitive 115, so that the shape of the representation of primitive 105 changes as the display surface resolution changes.

This inconsistency in the shape of the representation of the same primitive for different display surface resolutions produces rasterization results at the lower resolution that are inconsistent in terms of coordinate positions compared with rasterization results at the higher resolution. Therefore, if frame buffer memory were to be allocated for rasterization of the high resolution snapped primitive 115 based on the results of rasterization of the low resolution snapped primitive 110, the frame buffer memory may be allocated incorrectly because rasterization results for the low resolution snapped primitive 110 do not necessarily align with those of the high resolution snapped primitive 115.

For some classes of algorithms, it is desirable to have consistent rasterization results at different resolution levels. This is particularly true when rasterization is used for binning or allocation (determination for which parts of the screen contain geometry). For example, primitives for a scene may be rendered to a low resolution surface where each pixel represents a group of pixels for a higher resolution image. Conservative rasterization semantics require that "if any part (boundary) of a pixel is intersected by the primitive, the pixel is covered". During rasterization, a conservative coarse pixel should always be indicated as covered if any fine pixels represented by that coarse pixel are covered by a primitive. Because conventional vertex snapping uses the same snapping precision for different display surface resolutions, conventional vertex snapping does not necessarily conform to the conservative rasterization semantics.

Figure 2:
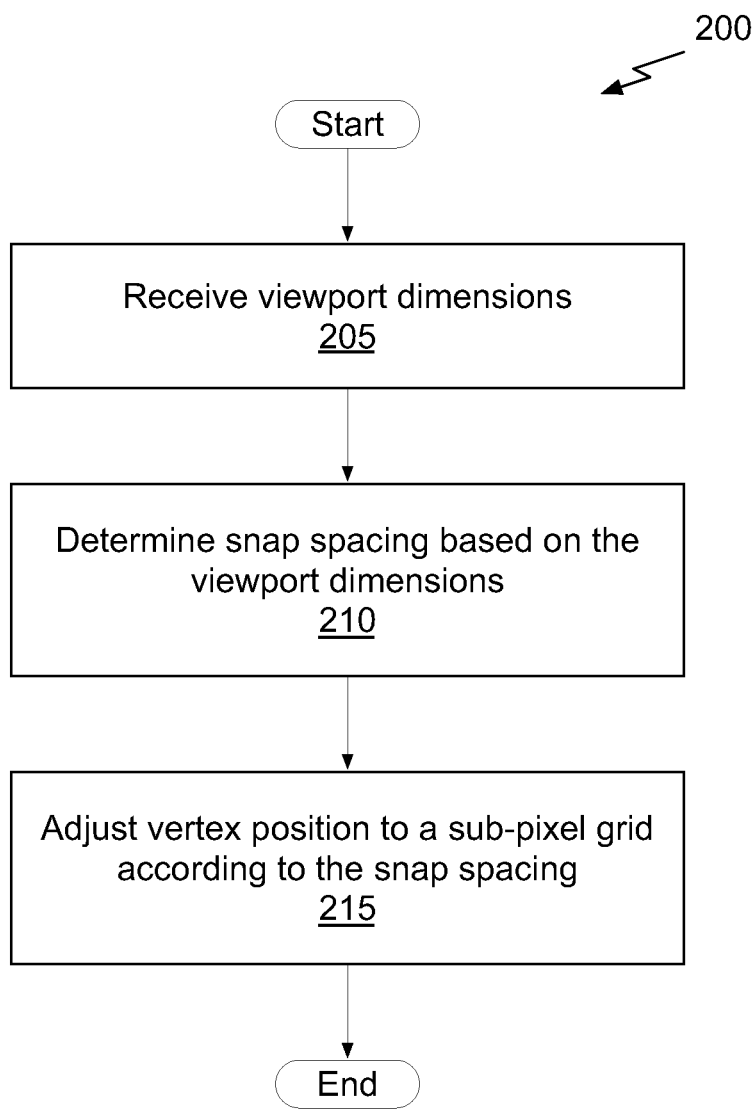
FIG. 2 illustrates a flowchart of a method for adjusting vertex positions based on a snap spacing, in accordance with one embodiment.

FIG. 2 illustrates a flowchart of a method 200 for adjusting vertex positions, in accordance with one embodiment. At step 205, viewport dimensions are received. The viewport dimensions may correspond to the pixel dimensions of a display surface. In one embodiment, the pixel dimensions correspond to the resolution of a display screen configured to display the display surface. At step 210, a snap spacing is determined based on the viewport dimensions. At step 215, a vertex position is adjusted to align to a grid that corresponds to the snap spacing. In one embodiment, the snapping precision varies based on the viewport dimensions to maintain consistency for different viewport resolutions.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Consistent rasterization may be produced for different viewport resolutions by varying the snap amount such that the amount of vertex movement in "world space" is uniform. Decreasing the snap spacing in half, whenever the resolution of the display surface is reduced by half produces consistent rasterization results. The viewport is the two-dimensional region of a display surface onto which a viewing volume for a scene is projected. Dimensions of the viewport are provided in pixels, so that as the height and/or width of the viewport decreases, the resolution of the display surface also decreases (assuming the pixel size is constant). Conversely, as the height and/or width of the viewport increases, the resolution of the display surface increases.

Figure 3A:
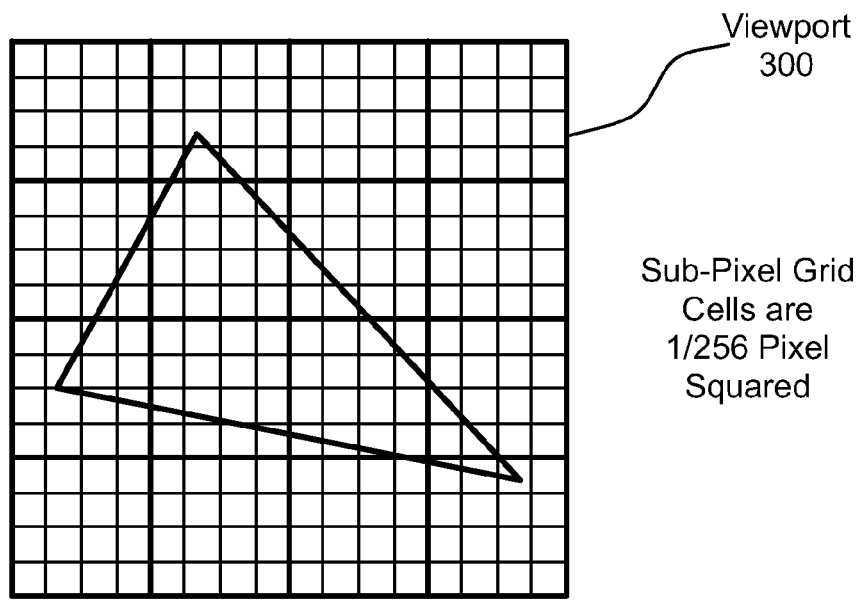
FIGS. 3A and 3B illustrate primitive vertex positions adjusted based on resolution dependent snap spacing, in accordance with one embodiment.
Figure 3B:
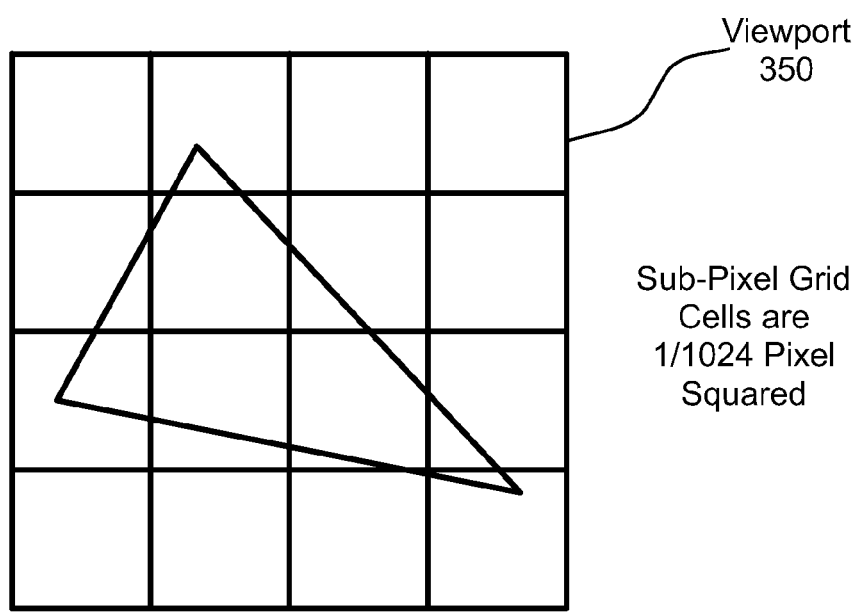

FIG. 3A illustrates primitive vertex positions adjusted based on resolution dependent snap spacing for a viewport 300, in accordance with one embodiment. The 16×16 pixel viewport 300 uses a 1/256 pixel snap spacing (i.e., the width and the height of the grid cells are 1/256$^{th}$ of the pixel width and height) to adjust the vertex positions to the sub-pixel grid. Therefore, the vertex snapping precision is 1/256$^{th}$ of a pixel. Note, that the sub-pixel grid cells have a finer resolution than the pixel grid shown in FIG. 3A. FIG. 3B illustrates primitive vertex positions adjusted based on resolution dependent snap spacing for a viewport 350, in accordance with one embodiment. The 4×4 pixel viewport 350 uses a 1/1024 pixel snap spacing (i.e., the width and height of the grid cells are 1/1024 of the pixel width and height) to adjust the vertex positions to the sub-pixel grid. Note, that the sub-pixel grid cells have a finer resolution than the pixel grid shown in FIG. 3B. When the dimensions of the viewport are reduced by ¼, the snap spacing is also reduced (1/256× ¼=1/1024), increasing the precision of the vertex snapping to produce consistent rasterization results. Therefore, the shape of the primitive is maintained for different pixel resolutions, as shown in FIGS. 3A and 3B.

The grid 350 may be used to snap the primitive vertices and perform binning by rasterizing to determine which regions of the display surface (i.e., bins) a primitive covers. When conservative rasterization is performed, if any boundary of a pixel is intersected by the primitive, the pixel is considered to be covered by the primitive. When conventional rasterization is performed, the pixel is considered to be covered when the primitive covers a sample location in the pixel (e.g., pixel center). After the binning is complete, the binned primitive's vertices may be snapped to the grid 300 and rasterized.

Resolution Invariant Edge Normalization

In order to produce an exact solution with a finer snap spacing for a hardware implementation of a rasterizer with limited accuracy (i.e., fixed point arithmetic), the rasterizer needs to have sufficient precision to represent the snap spacings. For example, the rasterizer should be capable of supporting snap spacings that are less than 1/256$^{th}$ of a pixel. Through the normalization of edge equations that are used for rasterization, the increased precision needed for smaller snap spacings can be accomplished without increasing the fixed point precision of the rasterizer.

A rasterizer determines coverage by evaluating edge equations to determine if a sample location within a pixel is inside or outside an edge of a primitive, where a triangle has three edges defined by the three vertices. A set of edge equations may be expressed as:

$E0 = e0\_start + delta\_x * edge\_slope\_x1\_mns\_x0 + delta\_y * edge\_slope\_y0\_mns\_y1$ $E1 = e1\_start + delta\_x * edge\_slope\_x1\_mns\_x2 + delta\_y * edge\_slope\_y1\_mns\_y2$ $$E2 = e2\_start + delta\_x * edge\_slope\_x2\_mns\_x0 + delta\_y * edge\_slope\_y2\_mns\_y0$$

The start value (e.g., e0_start, e1_start, and e2_start) is the location of edge equation at some fixed anchor location, delta_x and delta_y are the distance from the fixed anchor location, and the edge slopes (e.g., edge_slope_x1_mns_x0, edge_slope_y0_mns_y1, etc.) are computed based on the distance between pairs of vertices (i.e., the length of the edge). When the edge value E0, E1, or E2 is greater or equal to zero as some sample location, the sample is inside the respective edge. When a sample is inside all three edges of a primitive, the sample is inside the primitive.

In one embodiment, the edge slopes are normalized to maximize precision for large primitives that may be at least partially outside of the viewport. The rasterizer receives a pair of vertex differences (e.g., edge_slope_x1_mns_x0 and edge_slope_y0_mns_y1) and the difference in the exponents is used to produce a fixed point representation of the distances to maximize the precision of the slope ratios. The fixed point representation also provides a consistent rasterization result for different viewport resolutions, i.e., for different levels of hierarchical rasterization. When rendering using a lower resolution viewport with greater vertex position precision, the mantissas of each edge difference (e.g., edge_slope_x1_mns_x0 and edge_slope_y0_mns_y1) do not change, but the exponents of the edge differences scale as the viewport size is reduced. For example, as the resolution of the viewport is reduced by a power of two, the exponents are decremented by one. Since the difference between exponents is constant, the normalized edge equations are constant as the resolution of the viewport increases (i.e., becomes finer) or decreases (i.e., becomes coarser). Thus the overall edge equations such as:

$$E0 = e0\_start + delta\_x * edge\_slope\_x1\_mns\_x0 + delta\_y * edge\_slope\_y0\_mns\_y1$$

have fixed point slope values that remain constant as the viewport resolution varies and the e0_start value is reduced (i.e., shifted right) as the viewport resolution increases. The final determination of whether an edge is inside or outside a sample is computed based on whether the E value is greater or equal to zero. Therefore, the bits that are truncated by shifting e0_start to the right do not affect the coverage determination, and a consistent rasterization result is produced as the viewport size decreases and snap spacings also decrease (i.e., vertex snapping precision increases).

Figure 4A:
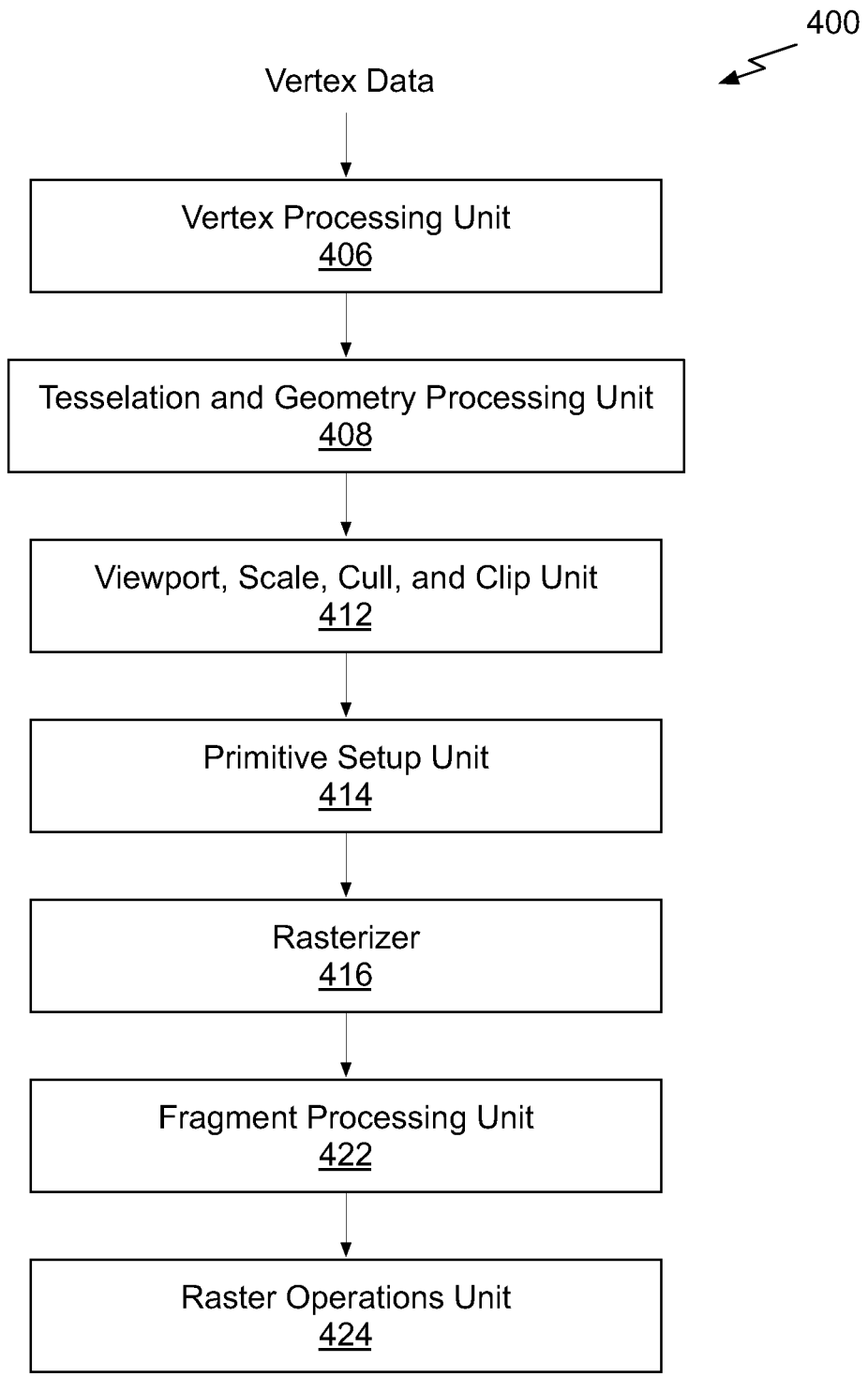
FIG. 4A illustrates a graphics processing pipeline, in accordance with one embodiment.

FIG. 4A illustrates a conceptual graphics processing pipeline 400, in accordance with one embodiment. The graphics processing pipeline 400 may be implemented using a programmable processing unit or using dedicated processing units for one or more functions. A vertex processing unit 406 is a programmable execution unit that is configured to execute vertex shader programs, lighting and transforming vertex data as specified by vertex shader programs. For example, the vertex processing unit 406 may be programmed to transform the vertex data from an object-based coordinate representation (object space) to an alternatively based coordinate system such as world space or normalized device coordinates (NDC) space.

The tessellation and geometry processing unit 408 is a programmable execution unit that is configured to execute tessellation shader programs. The tessellation and geometry processing unit 408 processes vertices produced by the vertex processing unit 406 and may be configured to generate graphics primitives known as patches and various patch attributes. In some embodiments, the tessellation and geometry processing unit 408 may also perform topology configuration, indexing the vertices, including vertices associated with patches, and compute texture coordinates corresponding to the vertices. The tessellation and geometry processing unit 408 may also be configured to execute geometry shader programs, thereby transforming graphics primitives. Vertices are grouped to construct graphics primitives for processing, where graphics primitives include triangles, line segments, points, and the like. For example, the tessellation and geometry processing unit 408 may be programmed to subdivide the graphics primitives into one or more new graphics primitives and calculate parameters, such as plane equation coefficients, that are used to rasterize the new graphics primitives. In some embodiments, the tessellation and geometry processing unit 408 may also add or delete elements in the geometry stream. The tessellation and geometry processing unit 408 outputs the parameters and vertices specifying new graphics primitives to a viewport scale, cull, and clip unit 412.

The viewport scale, cull, and clip unit 412 receives geometric data related to an object and executes a viewport transform on the geometric data, to produce coordinates for the vertices of the object in two-dimensional screen-space. A viewport processing unit within the viewport scale, cull, and clip unit 412 may be configured to perform the viewport transform, varying the snap spacing based on the viewport resolution. A certain resolution (e.g., width and height in pixels) that generally corresponds to a two-dimensional grid or space is specified for the viewport transform. The coordinates of the vertices of the object in the two-dimensional space have values that correspond to this resolution. Thus, for a resolution of 320×240 pixels, horizontal coordinates for vertices of an object can range from 0 to 320, and vertical coordinates can range from 0 to 240. For other resolutions, coordinates can have different ranges.

Calculations for the viewport transform typically include some rounding. That is, coordinates that result from the viewport transform have a certain amount of rounding applied, meaning that the results of the calculations for generating the screen-space vertices are rounded to a certain precision. The viewport transform also "snaps" coordinates for the object vertices to a specified sub-pixel grid. In other words, the screen-space positions for the vertices of the object that has had a viewport transform applied are aligned with a grid, where the cells (or "sub-pixels") of the grid have a size equal to a specified fraction of a pixel (for example, all cells in the grid may have a size equal to ¼th or ⅟₆₄th of a pixel). The snap spacing controls the precision to which vertices are snapped relative to the resolution of the viewport. The snap spacing is the dimension (height or width) of the cells in the grid and is specified as a fraction of a pixel. The "snapping" causes the coordinates of an object to be aligned with the sub-pixel grid. The results of the viewport transform include the effects of the snapping and rounding and generally include screen-space coordinates for each vertex of each object, aligned to the sub-pixel grid.

The viewport scale, cull, and clip unit 412 is configured to determine a snap spacing based on the viewport resolution. When the viewport resolution changes, the snap spacing may be increased or decreased to adjust the snap precision. More specifically, as the viewport size (in pixels) increases, the snap precision decreases (i.e., the fraction of the pixel specified as the snap spacing increases). Similarly, as the viewport size (in pixels) decreases, the snap precision increases (i.e., the fraction of the pixel specified as the snap spacing decreases). The snap spacing may be provided to the viewport scale, cull, and clip unit 412 by an application program or the viewport scale, cull, and clip unit 412 may be configured to compute the snap spacing for each viewport. In one embodiment, more than one viewport may be defined, and a snap spacing may be specified (or computed) for each one of the viewports. When hierarchical rasterization is supported, two of more viewports may be defined that correspond to different levels of the rasterization hierarchy. The viewport scale, cull, and clip unit 412 performs clipping, culling, and viewport scaling and outputs processed graphics primitives to a primitive setup unit 414.

The primitive setup unit 414 computes the edge equation coefficients for each edge of each primitive (e.g., edge start value, delta_x, delta_y), where an edge is defined by two of the adjusted (i.e., snapped) vertices of a primitive. As previously explained, the edge equations are typically in the form $E(x,y)=Ax+By+C$, where A, B, and C are the coefficients calculated by setup unit, x and y are coordinates of a pixel or sample to be evaluated by the edge equations, and $E(x,y)$ represents the result of evaluating the edge equation for one set of x-y coordinates. Even when the x,y vertex positions change due to snapping, the coefficients A and B (corresponding to delta x and delta y) are consistent across different resolutions when the edge slopes are normalized, as previously described. C is the edge start value and will be shifted right if the resolution is reduced by a power of two. Basically, when the resolution is halved, x, y, and C are halved and A and B remain the same. $E(x,y)$ is halved, but the sign (positive/zero or negative) of $E(x,y)$ is not affected. Therefore, the shape of a primitive is maintained between two different resolutions.

The rasterizer 416 receives the screen-space coordinates for vertices of an object and the edge equation coefficients from the primitive setup unit 414. The rasterizer 416 takes primitives and edge equations from the setup unit and evaluates the edge equations provided by the primitive setup unit 414 to determine coverage of samples or pixels for the object. The rasterizer 416 scan converts the new graphics primitives and outputs fragments and coverage data to fragment processing unit 422. Additionally, the rasterizer 416 may be configured to perform z culling and other z-based optimizations. In one embodiment the rasterizer 416 may be implemented as a coarse rasterizer that computes coarse coverage information and a fine rasterizer that computes coverage information at a sub-pixel granularity.

The fragment processing unit 422 is a programmable execution unit that is configured to execute fragment shader programs, transforming fragments received from the rasterizer 416, as specified by the fragment shader programs. For example, the fragment processing unit 422 may be programmed to perform operations such as perspective correction, texture mapping, shading, blending, and the like, to produce shaded fragments that are output to raster operations unit 424. Fragments may be shaded at pixel, sample, or other granularity, depending on the programmed sampling rate.

The raster operations unit 424 is a processing unit that performs raster operations, such as stencil, z test, blending, and the like, and outputs pixel data as processed graphics data for storage in graphics memory. The processed graphics data may be stored in memory, for display or for further processing. In some embodiments of the present invention, raster operations unit 424 is configured to compress z or color data that is written to memory and decompress z or color data that is read from memory.

Figure 4B:
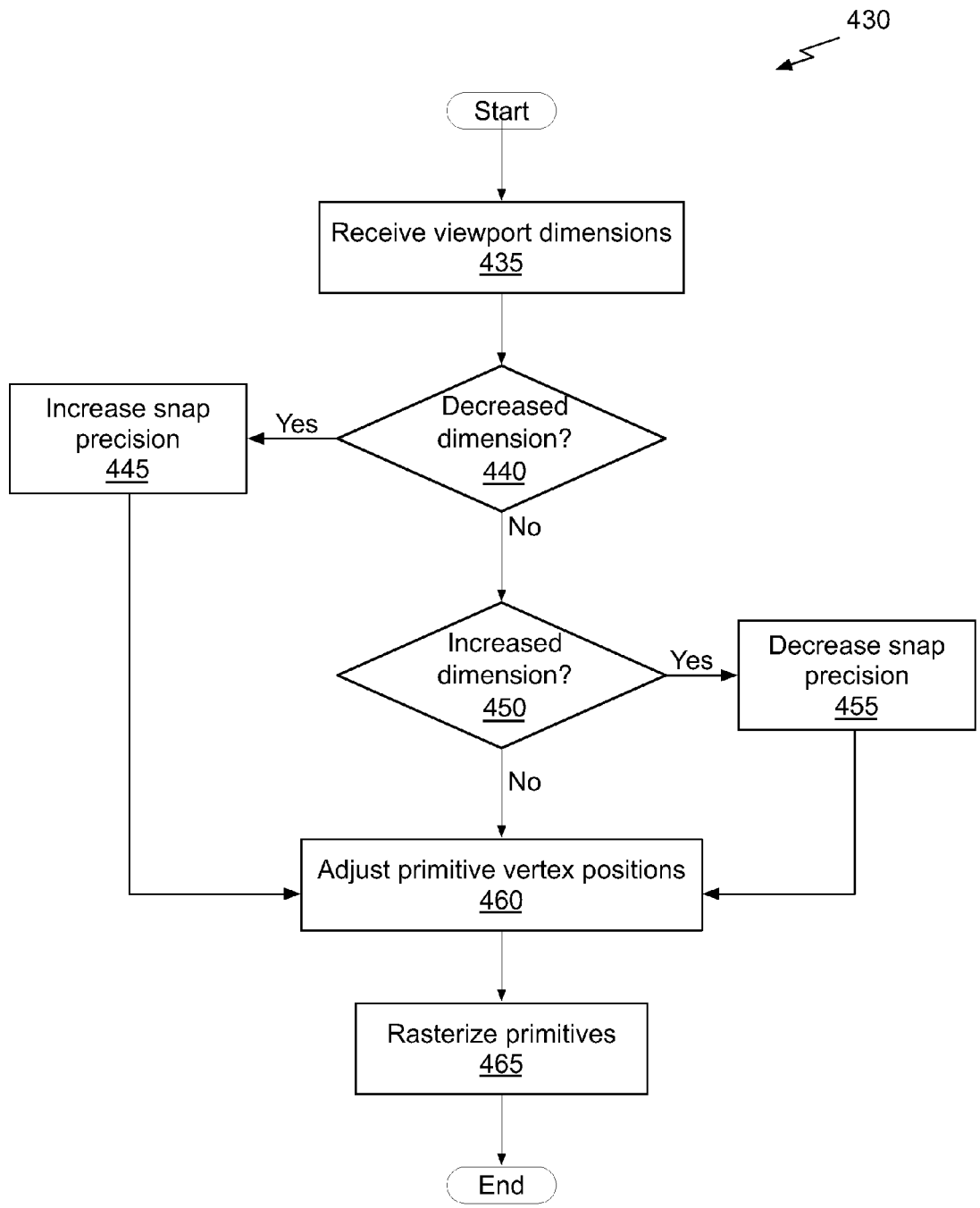
FIG. 4B illustrates another flowchart of a method for adjusting vertex positions based on a snap spacing, in accordance with one embodiment.

FIG. 4B illustrates another flowchart of a method 430 for adjusting vertex positions, in accordance with one embodiment. In one embodiment, the steps shown in method 430 may be performed by an application program, such as a vertex shader that is executed by a graphics processor. In another embodiment, the steps shown in method 430 may be performed by a processing unit within a graphics processor, such as the viewport scale, cull, and clip unit 412. At step 435, an application program or a processing unit receives viewport dimensions. At step 440, the application program or the processing unit determines if the viewport dimensions have decreased such that the snap precision should be changed, and, if so, at step 445, the snap spacing precision is increased. Otherwise, at step 450, the application program or the processing unit determines if the viewport dimensions have increased such that the snap precision should be changed, and, if so, at step 455, the snap spacing precision is decreased. Otherwise, the snap spacing is unchanged.

At step 460, the primitive vertex positions are adjusted to a sub-pixel grid according to the viewport dependent snap spacing to produce snapped vertex positions. At step 465, the primitives defined by the snapped vertex positions are rasterized.

Figure 5:
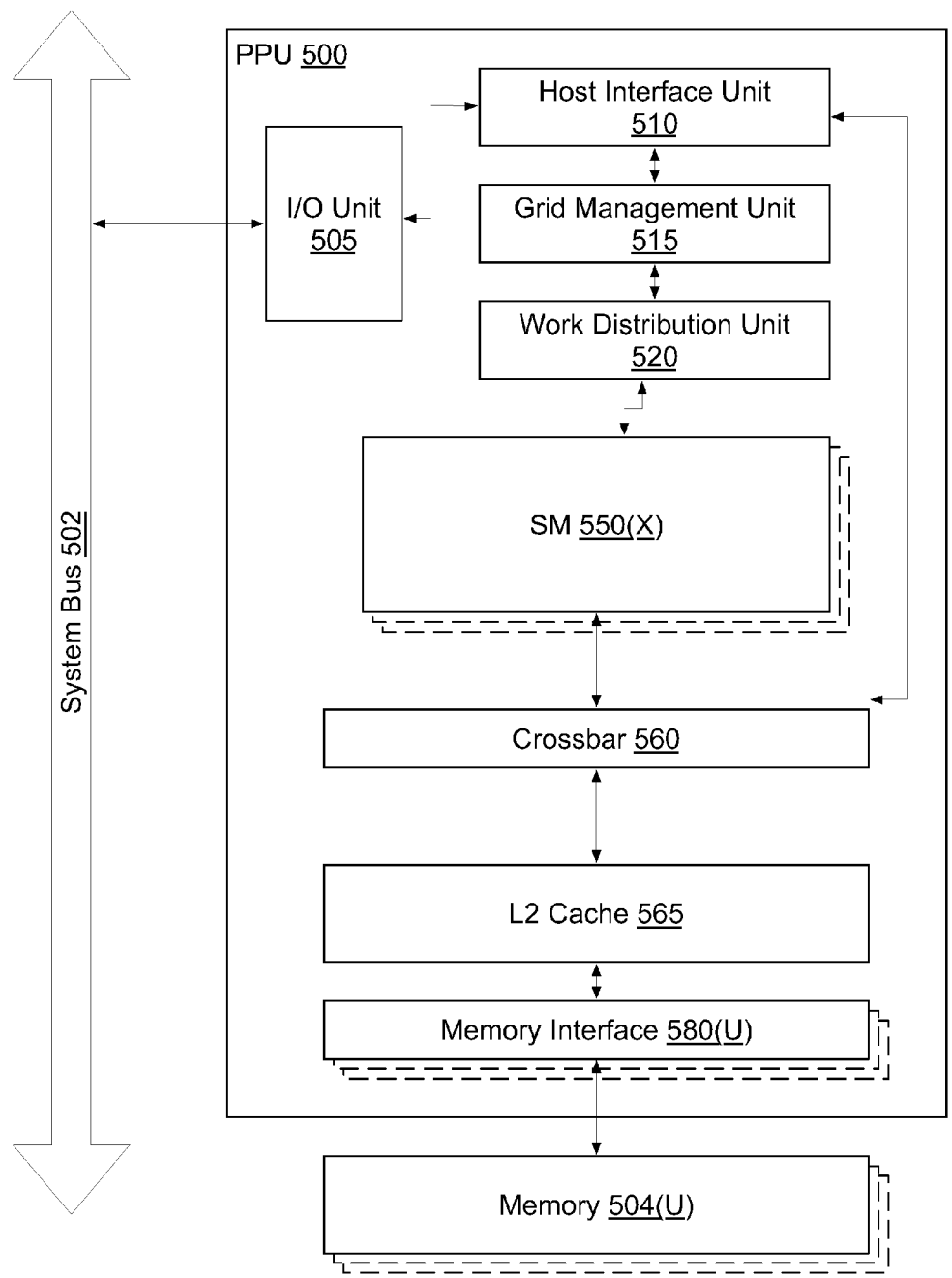
FIG. 5 illustrates a parallel processing unit (PPU), according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 550. Each SM 550, described below in more detail in conjunction with FIG. 6, may include, but is not limited to, one or more processing cores, one or more load/store units (LSUs), a level-one (L1) cache, shared memory, and the like.

In one embodiment, the PPU 500 includes an input/output (I/O) unit 505 configured to transmit and receive communications (i.e., commands, data, etc.) from a central processing unit (CPU) (not shown) over the system bus 502. The I/O unit 505 may implement a Peripheral Component Interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. In the context of the grid management unit 515, a grid is a quantity of processing work. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (GMU) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SMs 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 500 comprises X SMs 550(X). For example, the PPU 100 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network).

The L2 cache 565 is connected to one or more memory interfaces 580. Memory interfaces 580 implement 16, 32, 64, 128-bit data buses, or the like, for high-speed data transfer. In one embodiment, the PPU 500 comprises U memory interfaces 580(U), where each memory interface 580(U) is connected to a corresponding memory device 504(U). For example, PPU 500 may be connected to up to 6 memory devices 504, such as graphics double-data-rate, version 5, synchronous dynamic random access memory (GDDR5 SDRAM).

In one embodiment, the PPU 500 implements a multi-level memory hierarchy. The memory 504 is located off-chip in SDRAM coupled to the PPU 500. Data from the memory 504 may be fetched and stored in the L2 cache 565, which is located on-chip and is shared between the various SMs 550. In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PPU 500 comprises a graphics processing unit (GPU). The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. The GMU 515 may configure one or more SMs 550 to perform the functions of one or more of the processing units shown in FIG. 4A, e.g., a vertex processing unit, a tessellation processing unit, a geometry processing unit, and a fragment processing unit. The functions of viewport scale, cull, and clip processing unit, coarse rasterizer, fine rasterizer, and raster operations unit may also be performed by other processing engines within a GMU 515.

For example, the GMU 515 may configure one or more SMs 550 to execute a vertex shader program that processes a number of vertices defined by the model data. In one embodiment, the GMU 515 may configure different SMs 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 500 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 500 may be included on a graphics card that includes one or more memory devices 504 such as GDDR5 SDRAM. The graphics card may be configured to interface with a PCIe slot on a motherboard of a desktop computer that includes, e.g., a northbridge chipset and a southbridge chipset. In yet another embodiment, the PPU 500 may be an integrated graphics processing unit (iGPU) included in the chipset (i.e., Northbridge) of the motherboard.

Figure 6:
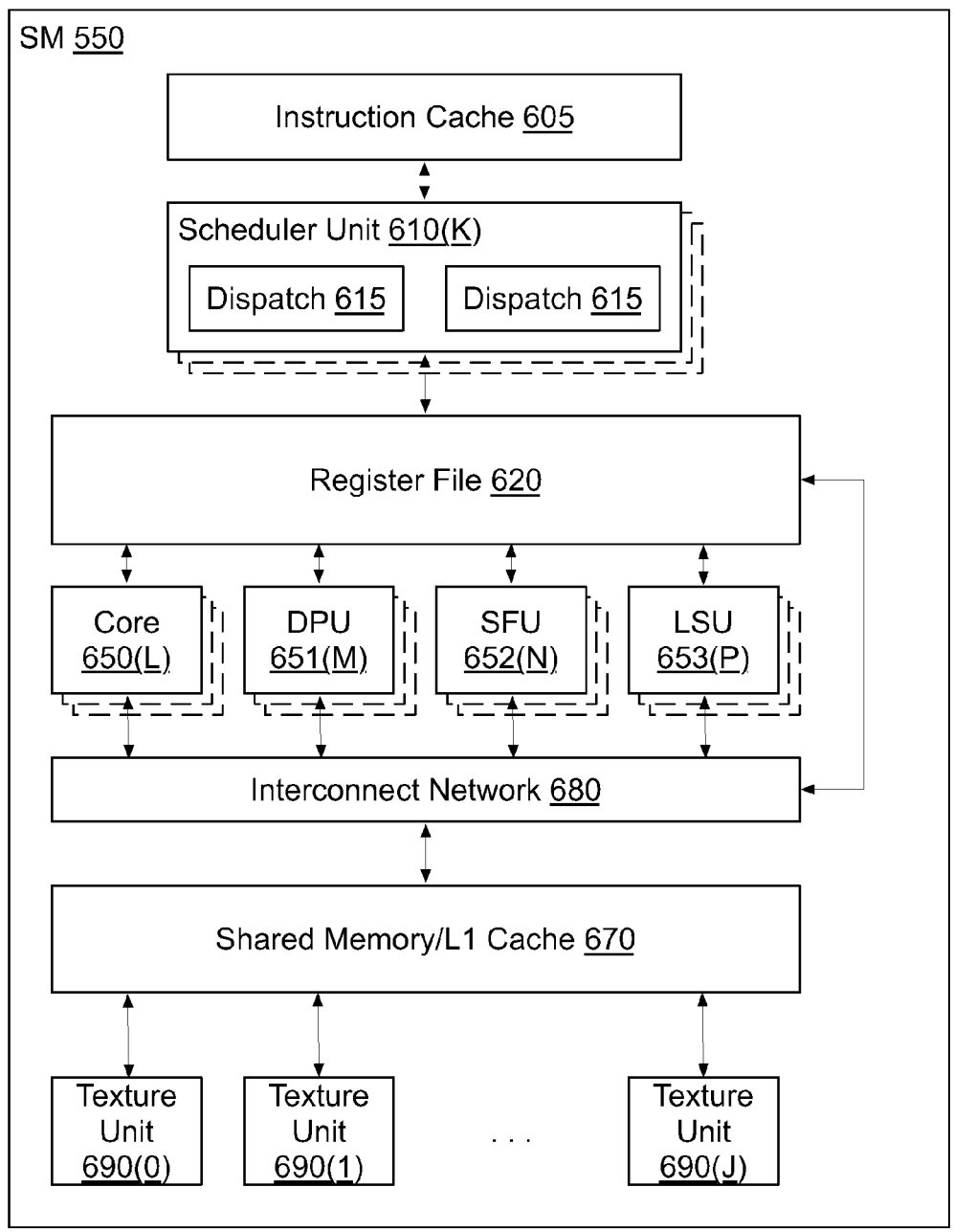
FIG. 6 illustrates the streaming multi-processor of FIG. 5, according to one embodiment.

FIG. 6 illustrates the streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SFUs) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units (i.e., cores 650, DPUs 651, SFUs 652, and LSUs 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 650 includes a register file 620 that provides a set of registers for the functional units of the SM 650. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N SFUs 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SFUs 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises J texture units 690. The texture units 690 are configured to load texture maps (i.e., a 2D array of texels) from the memory 504 and sample the texture maps to produce sampled texture values for use in shader programs. The texture units 690 implement texture operations such as anti-aliasing operations using mip-maps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

Figure 7:
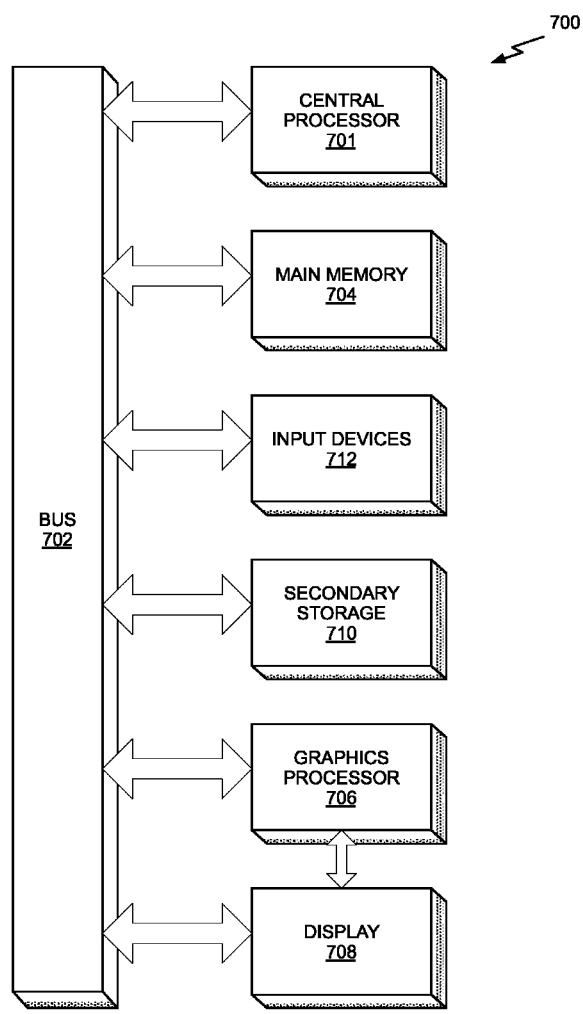
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for adjusting vertex positions that is executed by parallel processor, comprising:
    receiving one or more dimensions of a first viewport, wherein the dimensions of the first viewport are defined in pixels and correspond to a first pixel resolution;
    receiving one or more dimensions of a second viewport, wherein the dimensions of the second viewport are defined in pixels and correspond to a second pixel resolution that is different than the first pixel resolution;
    receiving a first snap spacing associated with a first sub-pixel grid of the first viewport, wherein a graphics primitive having vertices adjusted according to the first snap spacing to align to the first sub-pixel grid has a different shape compared with the graphics primitive having vertices adjusted according to the first snap spacing to align to a second sub-pixel grid of the second viewport;
    determining a second snap spacing of a fractional pixel based on the one or more dimensions of the second viewport,
    adjusting the vertex positions of the graphics primitive according to the second snap spacing to align to the second sub-pixel grid of the second viewport.

2. The method of claim 1, wherein the second snap spacing is less than the first snap spacing when the second pixel resolution is less than the first pixel resolution.

3. The method of claim 1, wherein the second snap spacing is greater than the first snap spacing when the second pixel resolution is greater than the first pixel resolution.

4. The method of claim 1, wherein the first snap spacing is less than $1/256^{th}$ of a pixel.

5. The method of claim 1, wherein a precision by which the vertex positions are adjusted to align to the second sub-pixel grid is greater than a precision by which the vertex positions are adjusted to align to the first sub-pixel grid.

6. The method of claim 1, wherein a precision by which the vertex positions are adjusted to align to the second sub-pixel grid is less than a precision by which the vertex positions are adjusted to align to the first sub-pixel grid.

7. The method of claim 1, further comprising, rasterizing the graphics primitive having the vertex positions adjusted according to the second snap spacing to align to the second sub-pixel grid of the second viewport.

8. The method of claim 1, further comprising computing edge equations for each edge of the graphics primitive that is defined by two of the vertex positions that were adjusted according to the second snap spacing to align to the second sub-pixel grid.

9. The method of claim 8, wherein computing of the edge equations comprises reducing a number of bits in an exponent of an edge slope value corresponding to an edge of the graphics primitive.

10. The method of claim 1, wherein a shape of the graphics primitive having vertices adjusted according to the first snap spacing to align to the first sub-pixel grid equals a shape of the graphics primitive having vertices adjusted according to the second snap spacing to align to a second sub-pixel grid of the second viewport.

11. A non-transitory computer-readable storage medium storing instructions that, when executed by a parallel processor, cause the parallel processor to adjust vertex positions, comprising:
    receiving one or more dimensions of a first viewport, wherein the dimensions of the viewport are defined in pixels and correspond to a first pixel resolution;
    receiving one or more dimensions of a second viewport, wherein the dimensions of the second viewport are defined in pixels and correspond to a second pixel resolution that is different than the first pixel resolution;
    receiving a first snap spacing associated with a first sub-pixel grid of the first viewport, wherein a graphics primitive having vertices adjusted according to the first snap spacing to align to the first sub-pixel grid has a different shape compared with the graphics primitive having vertices adjusted according to the first snap spacing to align to a second sub-pixel grid of the second viewport;
    determining a second snap spacing of a fractional pixel based on the one or more dimensions of the second viewport, and
    adjusting the vertex positions of the graphics primitive according to the second snap spacing to align to the second sub-pixel grid of the second viewport.

12. The non-transitory computer-readable storage medium of claim 11, wherein the second snap spacing is less than the first snap spacing when the second pixel resolution is less than the first pixel resolution.

13. The non-transitory computer-readable storage medium of claim 11, wherein the second snap spacing is greater than the first snap spacing when the second pixel resolution is greater than the first pixel resolution.

14. The non-transitory computer-readable storage medium of claim 11, wherein the first snap spacing is less than $1/256^{th}$ of a pixel.

15. A parallel processor system comprising:
    viewport processing unit that is configured to
        receive one or more dimensions of a first viewport, wherein the dimensions of the viewport are defined in pixels and correspond to a first pixel resolution;
        receive one or more dimensions of a second viewport, wherein the dimensions of the second viewport are defined in pixels and correspond to a second pixel resolution that is different than the first pixel resolution;
        receive a first snap spacing associated with a first sub-pixel grid of the first viewport, wherein a graphics primitive having vertices adjusted according to the first snap spacing to align to the first subpixel grid has a different shape compared with the graphics primitive having vertices adjusted according to the first snap spacing to align to a second sub-pixel grid of the second viewport;

determine a second snap spacing of a fractional pixel based on the one or more dimensions of the second viewport adjust the vertex positions of the graphics primitive according to the second snap spacing to align to the second sub-pixel grid the second viewport.

16. The system of claim 15, further comprising a setup unit that is coupled to the viewport processing unit and configured to compute an edge equation for each edge of the graphics primitive that is defined by two of the vertex positions that were adjusted according to the second snap spacing to align to the second sub-pixel grid.

17. The system of claim 16, wherein the setup unit is further configured to reduce a number of bits in an exponent of a edge slope value corresponding to an edge of the graphics primitive.

18. The system of claim 15, wherein the second snap spacing is less than the first snap spacing when the second pixel resolution is less than the first pixel resolution.

* * * * *

UNITED STATES PATENT AND TRADEMARK OFFICE
CERTIFICATE OF CORRECTION

PATENT NO. : 9,478,066 B2  
APPLICATION NO. : 13/830987  
DATED : October 25, 2016  
INVENTOR(S) : Eric Brian Lum et al.

Page 1 of 1

It is certified that error appears in the above-identified patent and that said Letters Patent is hereby corrected as shown below:

In the Claims

Column 15, Line 7 In Claim 15, please replace "viewport adjust" with --viewport; and adjust--;
Column 15, Line 9 In Claim 15, please replace "grid the" with --grid of the--.

Signed and Sealed this
Seventh Day of April, 2020

Andrei Iancu
*Director of the United States Patent and Trademark Office*